United States Patent
Gangloff et al.

(10) Patent No.: US 8,544,514 B2
(45) Date of Patent: Oct. 1, 2013

(54) SPOKED WHEEL RIM, MOUNTED ASSEMBLY INCORPORATING IT AND ITS METHOD OF ASSEMBLY

(75) Inventors: Norbert Gangloff, Ladon (FR); Philippe Bruandet, Pannes (FR)

(73) Assignee: Hutchinson, Paris (FR)

( * ) Notice: Subject to any disclaimer, the term of this patent is extended or adjusted under 35 U.S.C. 154(b) by 407 days.

(21) Appl. No.: 12/911,282

(22) Filed: Oct. 25, 2010

(65) Prior Publication Data

US 2011/0121637 A1    May 26, 2011

(30) Foreign Application Priority Data

Oct. 27, 2009    (FR) .................................... 09 05154

(51) Int. Cl.
*B60C 5/16*    (2006.01)
*B60B 21/12*    (2006.01)

(52) U.S. Cl.
USPC ............ 152/381.6; 152/DIG. 9; 152/DIG. 16

(58) Field of Classification Search
USPC ......... 152/381.6, 400, 427, 513, 514, DIG. 9, 152/DIG. 16, 379.4; 301/95.102
See application file for complete search history.

(56) References Cited

U.S. PATENT DOCUMENTS

| | | | | |
|---|---|---|---|---|
| 1,886,470 A | * | 11/1932 | Daddio | 152/503 |
| 2,913,034 A | * | 11/1959 | Wall | 152/513 |
| 3,077,219 A | * | 2/1963 | Solomon | 152/513 |
| 3,335,778 A | * | 8/1967 | Blagden et al. | 152/513 |
| 4,108,232 A | | 8/1978 | Simpson | |
| 4,289,186 A | * | 9/1981 | Wilde | 152/379.3 |
| 4,453,581 A | * | 6/1984 | Easterly | 152/511 |
| 5,117,891 A | * | 6/1992 | Simon | 160/263 |
| 7,104,300 B2 | * | 9/2006 | Veux et al. | 152/379.4 |
| 7,363,953 B2 | * | 4/2008 | Ferlin | 152/453 |
| 2005/0210675 A1 | * | 9/2005 | Price et al. | 29/894.31 |

FOREIGN PATENT DOCUMENTS

| | | |
|---|---|---|
| DE | 37 27 051 A1 | 2/1989 |
| DE | 195 42 982 A1 | 6/1996 |
| GR | 846016 | 8/1960 |

OTHER PUBLICATIONS

Search Report for French Application No. FR 09 05154, dated Jun. 2, 2010.

* cited by examiner

*Primary Examiner* — Kip T Kotter
(74) *Attorney, Agent, or Firm* — Alston & Bird LLP

(57) ABSTRACT

A spoked wheel rim for a wheeled vehicle, a mounted assembly incorporating this rim for such a vehicle and a method for assembling this mounted assembly is provided. This rim has two rim edges and a rim bottom covered by an annular ribbon that is flexible and sealed against the inflation gas that is intended to receive a tire and that is fitted with an inflation valve for inflating this tire. The ribbon includes a central portion conforming to the shape of this rim bottom and two lateral portions protruding axially from these rim edges. The lateral portions are capable of having a portion of their axial width cut off by the detachment of two respective peripheral sections of these lateral portions, so that this ribbon extends from one of the said edges to the other following this detachment.

12 Claims, 3 Drawing Sheets

SPOKED WHEEL RIM, MOUNTED ASSEMBLY INCORPORATING IT AND ITS METHOD OF ASSEMBLY

FIELD OF THE INVENTION

The present invention relates to a spoked wheel rim for a wheeled vehicle, a mounted assembly incorporating this rim for such a vehicle and a method for assembling this mounted assembly. The invention applies in particular to the mounted assemblies for bicycles.

BACKGROUND

In a known manner, the mounted assemblies for bicycles may incorporate means for pressurizing their internal space, whether it be via inner tubes provided between the tire and the wheel rim (such a mounted assembly is then called "tube-type") or else without an inner tube via the sealed mounting of the tire against the rim edges ("tubeless" mounted assembly).

Document U.S. Pat. No. 4,108,232 presents such a mounted assembly without inner tube in which the spoked wheel rim, of the type with a rim recess like a flared U, is covered with an annular ribbon that is flexible and sealed against the inflation gas which receives a tire in a sealed manner and which incorporates an inflation valve mounted through this rim recess. This ribbon extends axially from one rim edge to the other, it has axial ribs in a central portion conforming to the shape of the rim recess and two circumferential bulges at its lateral edges which respectively surmount the rim edges.

A major drawback of these known annular ribbons which cover the spoked wheel rims lies in the fact that they can be used only for a single axial rim width which makes it necessary to have as many different ribbons as there are rims to be fitted, defined by various widths of rim bottom and/or by various geometries of rim edges.

Another drawback of these known ribbons for spoked rims lies in their being put in place in contact with the rim bottom which can be awkward, and in their replacement which may be required following a puncture.

SUMMARY

One object of the present invention is to propose a spoked wheel rim for a wheeled vehicle, in particular for a bicycle, which makes it possible to remedy these drawbacks, the rim having two rim edges and a rim bottom covered with an annular ribbon that is flexible and sealed against the inflation gas that is intended to receive a tire and that is fitted with an inflation valve for inflating this tire, this ribbon having a central portion conforming to the shape of this rim bottom and two lateral portions protruding axially from these rim edges.

Accordingly, a rim according to the invention is such that the said lateral portions are capable of having a portion of their axial width cut off by the detachment of two respective peripheral sections of these lateral portions, so that this ribbon extends from one of the said edges to the other following this detachment.

It will be noted that these peripheral sections of the lateral portions of the ribbon, which protrude axially on either side of the rim edges while preferably being folded back radially towards the inside, make it possible to use a single model of ribbon according to the invention (i.e. of fixed width) to cover a plurality of rims of various axial widths measured between the two edges of each rim.

According to another feature of the invention, the said lateral portions may each have circumferential precut lines which are parallel and spaced in the axial direction, and which are capable of allowing the manual detachment of the said peripheral sections in axial locations determined as a function of the axial distance separating the said rim edges from one another.

Advantageously, these precut lines may comprise a multitude of continuous striations in the circumferential direction.

According to another feature of the invention, the said lateral portions may each have a radial thickness that is less than that of the said central portion, so as to prevent the "piercing" of the ribbon due to the pressure of the inflation gas in this central portion and to make it easier to detach each peripheral section in each lateral portion.

Advantageously, the said lateral portions can be connected to the said central portion by two circumferential bulges against which two beads of the tire are intended to be mounted. It will be noted that these bulges are optional, so a ribbon according to the invention could be totally bereft thereof.

According to another feature of the invention, the said ribbon may consist of an elastomer material, preferably based on at least one thermoplastic vulcanizate (TPV).

According to another feature of the invention, the said valve can be mounted secured to the said ribbon by being for example welded, bonded or sleeve-fitted radially through this ribbon in the said central portion.

According to one embodiment of the invention, each of the said rim edges may have a outer radial end which is curved back in the direction of the other edge and, before detachment of each peripheral section, each lateral portion may cover the said curved end both on the inner and outer faces of this end.

A mounted assembly according to the invention for a wheeled vehicle, in particular for a bicycle, has a wheel rim intended to be traversed by spokes of the wheel as defined above and a tire mounted on this rim.

Advantageously, this mounted assembly may initially have no inner tube, and its tire comprises two beads respectively mounted on the said lateral portions of the said ribbon.

It will be noted that this ribbon according to the invention may advantageously stay in place after removal of the tire followed a puncture. In other words, this ribbon does not necessarily have to be replaced or repositioned on the rim bottom, and it can therefore be used again after a tire change.

It will be noted also that this ribbon makes it possible to provide such a seal with the tire that there is no additional loss of inflation pressure when the tire is deformed at low pressure.

It will also be noted that, when there is a puncture, it is sufficient to remove the inflation valve from the ribbon that is mounted removably on the latter, and to insert an inner tube between this ribbon and the tire to ensure running in satisfactory conditions.

A method according to the invention for assembling this mounted assembly comprises the following steps:

a) the ribbon is applied around and in close contact with the rim so that it conforms to the axial profile of the rim, from one of the said rim edges to the other while axially protruding from the said rim edges via the said peripheral sections folded back radially towards the inside of these edges, b) the valve mounted through this ribbon is clamped to the rim, c) the beads of the tire are mounted onto the said ribbon preferably after having lubricated the outer face of this ribbon and/or these beads, d) the tire is inflated via the said valve, and then e) these peripheral sections of the said respective lateral portions incorporating them are detached in two axial locations which are a function of the axial width of the rim, preferably in two precut circumferential lines respectively formed in these axial locations.

According to another feature of the invention, this assembly method also comprises a step of positioning the valve in the orifice of the rim bottom which is designed to receive it, this positioning step being applied before the step a) if the valve is first mounted secured to the ribbon or else after the step a) and before the step b) in the contrary case by mounting this valve through the said central portion of the ribbon and through this orifice.

It will be noted that it is easy for the operator to install the ribbon according to the invention irrespective of the axial width of the rim bottom, via the detachment of these peripheral sections of the ribbon.

BRIEF DESCRIPTION OF THE DRAWINGS

Other features, advantages and details of the present invention will emerge on reading the following description of an exemplary embodiment of the invention, given as an illustration and in a non-limiting manner, the said description being made with reference to the attached drawings, amongst which.

DETAILED DESCRIPTION

Figure 1:
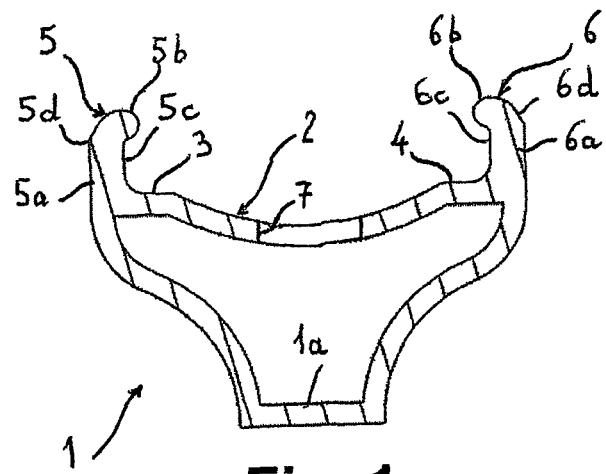
FIG. 1 is a half-view in axial section of an example of a wheel rim that can be used to receive an annular ribbon according to the invention.

The wheel rim 1 illustrated in FIG. 1 is for example of the type of a bicycle, and it is designed to be traversed by spokes via orifices (not visible in this sectional plane) arranged in a radially inner portion 1a of the rim 1 which is surmounted by the rim bottom 2 designed to receive a ribbon 10 according to the invention. This rim bottom 2 has, in this example, a slightly concave radially outer face which is extended axially by two flat bearing surfaces 3 and 4 respectively adjacent to the two rim edges 5 and 6. Each edge 5, 6 has a radial portion 5a, 6a extending perpendicular to the adjacent bearing surface 3, 4, which terminates in a radially outer apex 5b, 6b curved back in the direction of the other edge 6, 5. Also shown in FIGS. 1 to 5 is a hole 7 for the head of a spoke (for example of circular shape) which shows the rim bottom 2 and which is used, via the insertion of an appropriate tool, for the mounting and the adjustment of tension of each spoke.

It will be noted however that a rim according to the invention could have different geometries of rim bottom and/or of edges, provided that they are adapted to a spoked wheel such as for example a bicycle wheel.

Figure 2:
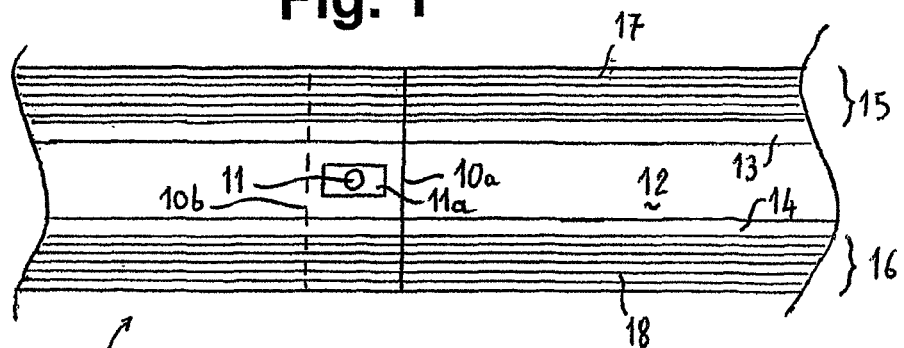
FIG. 2 is a partial schematic and top view of this ribbon according to a preferred example of the invention.

The ribbon 10 according to the invention which is illustrated in FIG. 2 is based on a material that is flexible and sealed against the inflation gas, such as for example a thermoplastic vulcanizate (TPV) such as "Vegaprene", in a non-limiting manner. This ribbon 10 is pre-fitted with a valve 11 for the inflation of the tire 20 to be mounted on the rim 1, this valve 11 (visible in FIG. 2) being for example sleeve-fitted or welded through the ribbon 10 perpendicular to the latter. In the example of FIG. 2, a valve-support unit 11a (for example formed of a rubber block) surrounds the end of this valve 11 designed to lead to the inside of the inner space of the tire 20, this unit 11a being butt-mounted against the radially outer face of the ribbon.

This ribbon 10 is capable of taking a closed annular shape in contact with the rim 1, by a securing of its two ends 10a and 10b one with the other that can be carried out by a mutual overlapping of these ends 10a and 10b, as can be seen in FIG. 2.

The ribbon 10 comprises over the whole of its length:
a central portion 12 in a transverse direction of the ribbon 10, which is designed to be applied to the rim bottom 2 and which has a maximum thickness while being delimited transversely by two optional bulges 13 and 14 against which the two beads 21 and 22 of the tire 20 are intended to be mounted, the valve 11 being mounted through this central portion 12 and advantageously in the zone of overlap of the ends 10a and 10b of the ribbon 10 so as to fix them to one another, and
two lateral portions 15 and 16 of minimum thickness which are respectively adjacent to these bulges 13 and 14 and which each have a multitude of circumferential precut lines 17 and 18 that are parallel and spaced in the transverse direction such as continuous striations over the length of the ribbon 10.

According to the invention, these precut lines 17 and 18 are designed to allow the manual cutting of respective peripheral sections 15a and 16a of these lateral portions 15 and 16 (these sections can be seen in FIGS. 3 and 4), in axial locations that are precisely determined as a function of the axial width separating the rim edges 5 and 6. Accordingly, the transverse distance separating two consecutive lines 17 and 18 is advantageously designed to be relatively small, in order to allow an adjustment of the lateral edges 15b and 16b of the ribbon 10 precisely on the corresponding rim edges 5 and 6 after this cutting.

Figure 3:
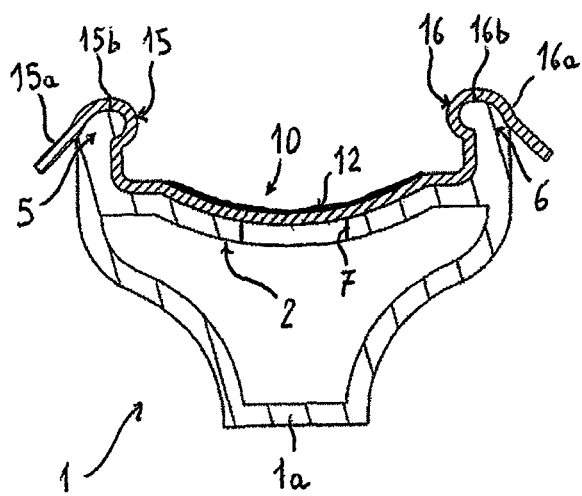
FIG. 3 is a half-view in axial section of the rim of FIG. 1 to which a ribbon according to the invention is applied before the mounting of the tire on this ribbon.
Figure 4:
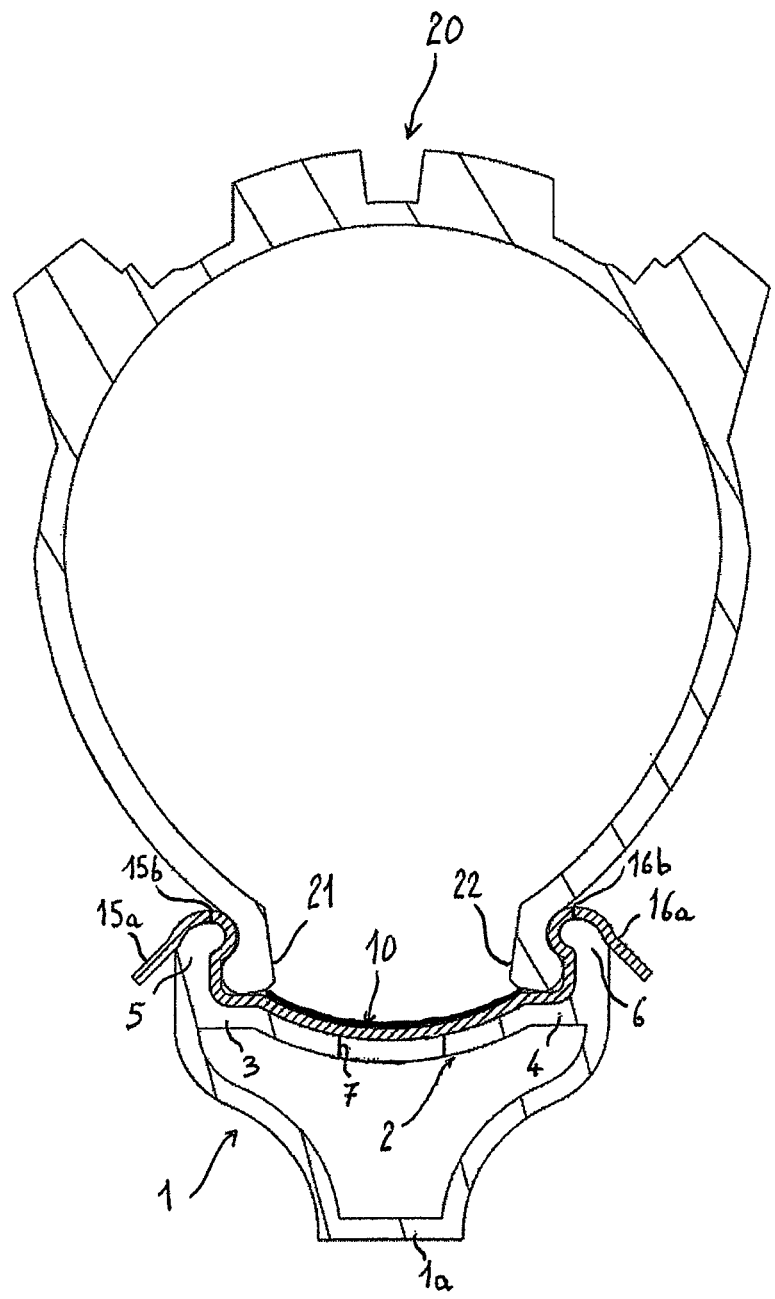
FIG. 4 is a half-view in axial section of the rim provided with the ribbon according to FIG. 3, after mounting of the tire on this ribbon.
Figure 5:
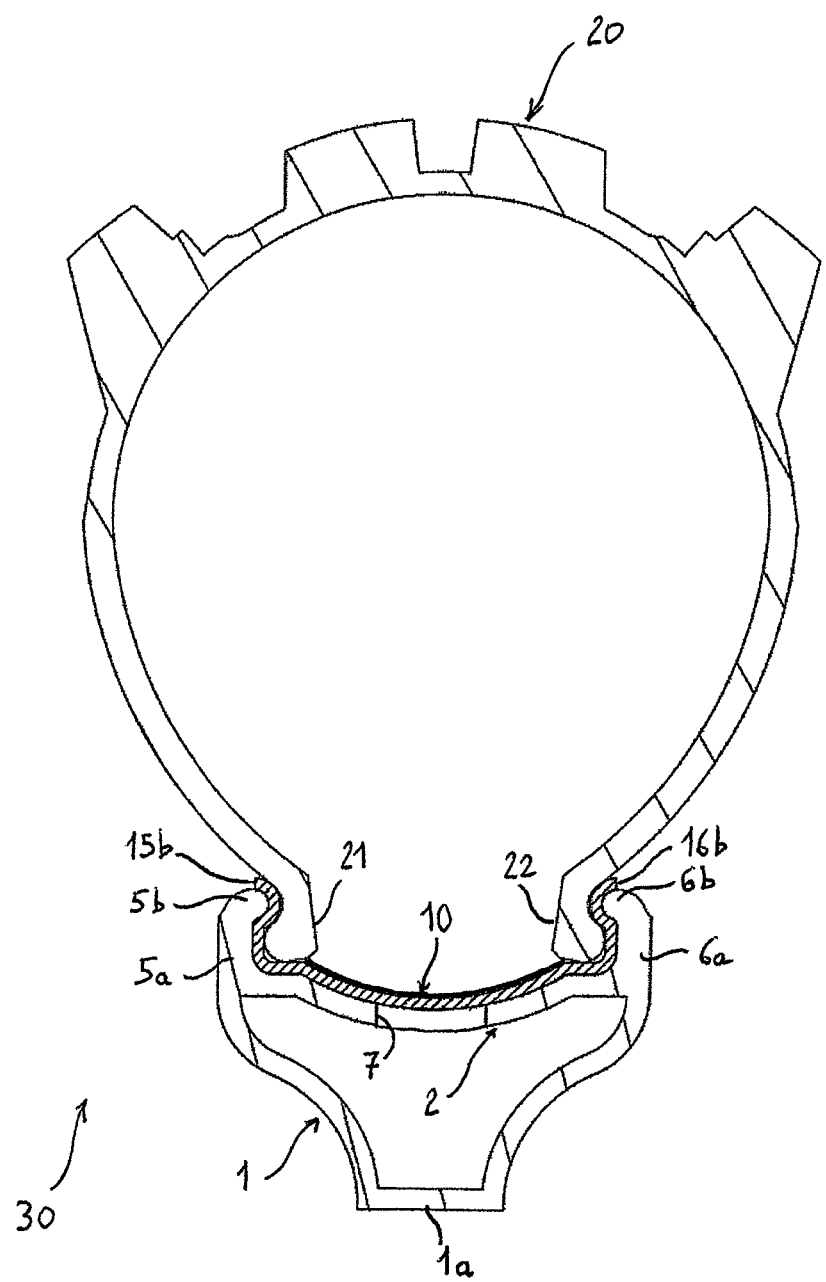
FIG. 5 is a half-view in axial section of the mounted assembly of FIG. 4 after detachment of the two peripheral portions of the ribbon.

As illustrated in FIGS. 3 to 5, it is possible to proceed as follows for the insertion of the ribbon 10 into the mounted assembly 30 obtained in FIG. 5.

The user begins by positioning the valve 11 which is secured to the ribbon 10 in an orifice of the rim bottom 2 (this orifice is not visible in FIGS. 3 to 5) designed to receive it, then the ribbon 10 is pressed around the rim 1. Because of the circumferential tensioning of the ribbon 10, the latter then conforms perfectly to the axial profile of the rim 1. As can be seen in FIG. 3, the ribbon 10 then extends from one rim edge 5 to the other 6 while protruding axially on either side 5c, 5d and 6c, 6d of these edges 5 and 6. The valve 11 is then clamped to the rim 1 by screwing its nut thereto.

The user then proceeds with the axial centering of the ribbon 10 on the rim bottom 2 so that this ribbon protrudes laterally from the edges 5 and 6 substantially by one and the same lateral distance which corresponds to the axial width of the peripheral sections 15a and 16a, which are folded back radially towards the inside (i.e. substantially in contact with the respective outer faces of the edges 5 and 6) in readiness for cutting them.

The radially outer face of the ribbon 10 and the beads 21 and 22 of the tire 20 that it is designed to receive are then lubricated.

As illustrated in FIG. 4, these beads 21 and 22 are then mounted on the ribbon 10 radially facing the flat bearing faces 3 and 4 of the rim 1 and then the internal space of the tire 20 is inflated via the valve 11 to the desired pressure.

In the last step for assembling this mounted assembly 30 the result of which is illustrated in FIG. 5, the two peripheral portions 15a and 16a are cut in two axial locations determined by means of the precut lines 17 and 18, which has the effect of defining, by virtue of the axial width of the rim 10 used, the lateral edges 15b and 16b of the ribbon 10. It can be seen that the latter thus conform to the contour of the respective curved ends 5b and 6b of the rim edges 5 and 6 but without extending over the outer face of the radial portions 5a and 6a of these edges 5 and 6 so as not to hamper the operation of the brakes of the vehicle. In the example of FIG. 5, each lateral edge 15b, 16b of the ribbon thus cut extends substantially in the radial extension of the inner face of the radial portion 5a, 6a of the corresponding edge 5, 6.

The invention claimed is:

1. Spoked wheel rim for a bicycle, the rim having two rim edges and a rim bottom covered with an annular ribbon that is flexible and sealed against the inflation gas that is configured to receive a tire and that is fitted with an inflation valve for inflating said tire, the ribbon having a central portion conforming to the shape of the rim bottom and two lateral portions protruding axially from said rim edges, characterized in that the said lateral portions are configured to be brought to a position where a portion of their axial width has been cut off by the detachment of two respective peripheral sections of said lateral portions and where the ribbon extends from one of the said edges to the other following this detachment.

2. The wheel rim according to claim 1, characterized in that the said lateral portions each have circumferential precut lines which are parallel and spaced in the axial direction, and which are configured of allowing the manual detachment of the said peripheral sections in axial locations determined as a function of the axial distance separating the said rim edges from one another.

3. The wheel rim according to claim 2, characterized in that the said precut lines comprise a multitude of continuous striations in the circumferential direction.

4. The wheel rim according to claim 1, characterized in that the said lateral portions each have a radial thickness that is less than that of the said central portion, so as to make it easier to detach each peripheral section.

5. The wheel rim according to claim 1, characterized in that the said lateral portions are connected to the said central portion by two circumferential bulges against which two beads of the tire are configured to be mounted.

6. The wheel rim according to claim 1, characterized in that the said ribbon consists of an elastomer material based on at least one thermoplastic vulcanizate (TPV).

7. The wheel rim according to claim 1, characterized in that the said valve is mounted and secured to said ribbon by being welded, bonded or sleeve-fitted radially through the ribbon in the said central portion.

8. The wheel rim according to claim 1, characterized in that each of the said rim edges has an outer radial end which is curved back in the direction of the other edge and in that, before detachment of each peripheral section, each lateral portion covers the said curved end both on the inner and outer faces of this end.

9. Mounted assembly for a bicycle, having a wheel rim configured to be traversed by spokes of the wheel and a tire mounted on said rim, characterized in that the said rim is defined as in claim 1.

10. Mounted assembly according to claim 9, characterized in that said mounted assembly has no inner tube and in that the said tire comprises two beads respectively mounted on the said lateral portions of the said ribbon.

11. Method for assembling a mounted assembly according to claim 9, characterized in that it comprises the following steps:

a) applying the ribbon around and in close contact with the rim so that the ribbon conforms to the axial profile of the rim, from one of the said rim edges to the other while axially protruding from the said rim edges via the said peripheral sections folded back radially towards the inside of these edges, b) mounting the valve through said ribbon so that the valve is clamped to the rim, c) mounting the beads of the tire onto the said ribbon after having lubricated the outer face of this ribbon and/or these beads, d) inflating the tire via the said valve, and then e) these peripheral sections of the said respective lateral portions incorporating them are detached in two axial locations which are a function of the axial width of the rim in two precut circumferential lines respectively formed in these axial locations.

12. The method according to claim 11, characterized in that it also comprises a step of positioning the said valve in the orifice of the said rim bottom which is configured to receive said valve, this positioning step being applied before the step a) if the valve is first mounted secured to the ribbon or else after the step a) and before the step b) in the contrary case by mounting this valve through the said central portion of the ribbon and through this orifice.

* * * * *